(12) United States Patent
Uebbing et al.

(10) Patent No.: US 12,734,649 B2
(45) Date of Patent: Sep. 15, 2026

(54) ELECTRIC HAND TOOL WITH TORQUE SENSOR AND CERTIFICATION SYSTEM

(71) Applicant: NCTE AG, Oberhaching (DE)

(72) Inventors: Jürgen Uebbing, Munich (DE); Bernhard Mayr, Munich (DE); Verena Graf, Munich (DE)

(73) Assignee: NCTE AG, Oberhaching (DE)

( * ) Notice: Subject to any disclaimer, the term of this patent is extended or adjusted under 35 U.S.C. 154(b) by 532 days.

(21) Appl. No.: 17/974,751

(22) Filed: Oct. 27, 2022

(65) Prior Publication Data

US 2023/0140592 A1 May 4, 2023

(30) Foreign Application Priority Data

Oct. 28, 2021 (EP) .................................... 21205143

(51) Int. Cl.
*B25B 21/00* (2006.01)
*B25B 23/147* (2006.01)
*G06K 7/14* (2006.01)
*B60B 29/00* (2006.01)

(52) U.S. Cl.
CPC .......... *B25B 21/002* (2013.01); *B25B 23/147* (2013.01); *G06K 7/1417* (2013.01); *B60B 29/006* (2013.01)

(58) Field of Classification Search
CPC .... B25B 2/002; B25B 23/147; G06K 7/1417; B60B 29/006
See application file for complete search history.

(56) References Cited

U.S. PATENT DOCUMENTS 5,440,215 A * 8/1995 Gilmore .................. B25F 5/001 388/930
6,318,189 B1 11/2001 Donaldson
6,513,395 B1 * 2/2003 Jones ...................... G01L 3/103 73/862.333
6,971,454 B2 * 12/2005 Bogue .................. B25B 23/147 318/281
7,062,979 B2 * 6/2006 Day ...................... B25B 23/147 73/862.22
2002/0033267 A1 * 3/2002 Schweizer ............. B25B 23/14 173/2

(Continued)

FOREIGN PATENT DOCUMENTS

CA 3108639 A1 * 8/2021 ........ H02J 7/007194
EP 3050790 B1 5/2018

(Continued)

*Primary Examiner* — Michelle Lopez
(74) *Attorney, Agent, or Firm* — Young Basile Hanlon & MacFarlane, P.C

(57) ABSTRACT

An electric hand tool has a driving unit for driving a shaft of the electric hand tool and configured to drive, via the shaft, a socket of the electric hand tool or a socket connectable to the electric hand tool; a torque sensor for measuring a torque applied to the shaft via the driving unit; a control unit for controlling the driving unit to limit the measured torque to a predetermined value and/or to adjust the measured torque to the predetermined value within a tolerance range; and a transmitter for transmitting data from the electric hand tool to an external memory, the data comprising a final torque value. A method provides a traceable logging of a torque value and issuance of a corresponding certificate.

15 Claims, 4 Drawing Sheets

(56) References Cited

U.S. PATENT DOCUMENTS

2004/0182587 A1* 9/2004 May .................... B25B 23/1405 173/176
2006/0009924 A1 1/2006 McGee et al.
2011/0023280 A1 2/2011 Renke
2012/0174525 A1 7/2012 Hinshaw et al.
2013/0091959 A1* 4/2013 Lee ....................... G01L 3/1435 29/428
2013/0126202 A1* 5/2013 Oomori ................... B25B 21/00 173/217
2013/0133912 A1* 5/2013 Mizuno ............... B25B 23/1405 173/180
2013/0193891 A1* 8/2013 Wood ........................ H02P 6/08 318/434
2015/0014004 A1* 1/2015 Schubert ................. B23B 49/00 173/1
2015/0021062 A1* 1/2015 Sekino .................... B25B 23/14 173/183
2015/0247745 A1* 9/2015 McClogan ............... G01D 7/00 702/33
2017/0016469 A1* 1/2017 Zhu .................... G06K 19/0775
2018/0169844 A1* 6/2018 Nemecek .............. G09F 3/0297
2019/0294138 A1* 9/2019 Dobashi ............... G05B 19/418
2020/0086464 A1 3/2020 Ebauer et al.
2021/0078147 A1 3/2021 Agashe et al.

FOREIGN PATENT DOCUMENTS

EP 4116688 A1 1/2023
GB 2511591 A 9/2014
WO 2004/003695 A2 1/2004
WO WO-2017151954 A1 * 9/2017 ............ B25B 23/14

* cited by examiner

ELECTRIC HAND TOOL WITH TORQUE SENSOR AND CERTIFICATION SYSTEM

CROSS-REFERENCE TO RELATED APPLICATION(S)

This application claims priority to European Patent Application Serial No. 21 205 143.7, filed Oct. 28, 2021, the entire disclosure of which is hereby incorporated by reference.

TECHNICAL FIELD

The invention relates to an electric hand tool with a torque sensor, a related certification system and method.

BACKGROUND

Torque adjustment for nuts or bolts in vehicles, such as to attach wheels, is presently done manually with a mechanical torque wrench by the workshop mechanics. The respective maximum torque is set via a mostly mechanical slipping clutch or by pneumatic pressure. This has the disadvantage that it is not possible to verify that the correct torque has been used. In other words, there is no traceable logging of the respective torque values that have actually been applied.

However, safety regulations require an exact setting of the individual specified torque, which depends on the vehicle type and the respective rim type. Presently, it is not possible for an auto repair shop, for example in case of doubt, to prove that the correct settings have been applied.

SUMMARY

It is the object of the present invention to overcome at least some of the above mentioned disadvantages.

This object is achieved by an electric hand tool as disclosed herein.

The electric hand tool according to the invention comprises a driving unit for driving a shaft of the electric hand tool and configured to drive, via the shaft, a socket of the electric hand tool or connectable to the electric hand tool; a torque sensor for measuring a torque applied to the shaft via the driving unit; a control unit for controlling the driving unit to limit the measured torque to a predetermined value and/or to adjust the measured torque to the predetermined value within a tolerance range; and a transmitter for transmitting data from the electric hand tool to an external memory, the data comprising a final torque value. The electric hand tool according to the invention may be an impact wrench or a screw driver. The control unit may determine the final measured torque value applied to the shaft and may control the transmitter to transmit the final applied torque value to the external memory. The limitation of the torque value to the predetermined value may be to provide a final torque value below the predetermined value or above the predetermined value. Accordingly, the predetermined value may be a maximum torque value or a minimum torque value, respectively.

The socket may be a part of the electric hand tool or may be connectable to the electric hand tool. The socket may receive a fastening element such as a nut, bolt or screw that can be driven and fixed to an object (in case of an impact wrench or screw driver, for example). The control unit receives a measurement signal from the torque sensor and controls the driving unit to adjust the applied torque value by increasing the torque until it is within a predefined tolerance range around the predetermined value that is used for a current fastening process. The predetermined value and/or the tolerance range may be stored in a memory of the electric hand tool. For example, the tolerance range may be ±10% or less, preferably for example 5% or less, of the predetermined torque value.

In a development of the electric hand tool according to the invention, the torque sensor may comprise a magnetostrictive torque sensor or a strain gage.

The magnetostrictive torque sensor has the advantage of providing reliable and repeatable measurements in different environments.

In a further development, the magnetostrictive torque sensor may comprise a magnetized portion of the shaft and a magnetic field sensor for detecting a magnetic field change external to the shaft. The shaft may be a solid shaft or a hollow shaft.

In this development the driven shaft is magnetized and the magnetic field is provided near the magnetized portion to determine the magnetic field changes when a torque is applied, which torque results in a torsion of the shaft and thereby generating the magnetic field change at the location of the magnetic field sensor due to the inverse magnetostrictive effect. The magnetization of the shaft may be provided during manufacturing of the electric hand tool, and a calibration of the magnetic field sensor signal in relation to the applied torque may be stored in a memory of the sensor.

According to another development, the magnetostrictive torque sensor may comprise a magnetized portion of a disk, such as a spoke of the disk, and a magnetic field sensor for detecting a magnetic field change external to the disk. The disk may be wheel-shaped having spokes between an inner and an outer portion of the disk.

In this development, the shaft may be connected to a central portion of the disk and the socket may be connected to an outer portion of the disk. Accordingly, when the shaft is driven, the disk is subjected to stress and the magnetized portion of the disk generates a magnetic field change at the location of the magnetic field sensor via the inverse magnetostrictive effect. In particular, the disk may have spokes connecting the inner portion and the outer portion of the disk, and one or more spokes may be magnetized. The magnetization of the disk may be provided during manufacturing of the electric hand tool, and a calibration of the magnetic field sensor signal in relation to the applied torque may be stored in a memory of the sensor.

According to another development, the electric hand tool may further comprise an add-on module separable from the housing and comprising an extension portion of the shaft, wherein the torque sensor is provided in the add-on module.

In this development the add-on module is a separate part that can be used when a torque measurement is required and/or when a certification (see below) is required. The add-on module may be connected to the shaft on one side of the module and to the socket on the opposite side of the module. The driven shaft may in turn drive the extension portion of the shaft of the module.

In another development, the electric hand tool may further comprise at least one selected form the group including: a unit for determining the geo-position of the electric hand tool, a clock unit for determining a current time and/or a duration of torque application, a unit for determining a number of rotations or a rotation angle of the shaft, in particular after a minimum torque value has been reached, a unit for determining object data for an object to which a fastening element, such as a bolt or nut, is fastened by the electric hand tool, and a unit for determining a type and/or material of the fastening element.

This has the advantage that the exact position of the electric hand tool and/or a current time and/or a duration and/or object data for an object to which a fastening element is fastened and/or a type and/or material of the fastening element may be recorded, each in relation to a current fastening process.

This can be further developed in that the unit for determining object data and/or the unit for determining a type and/or material of the fastening element may comprise a scanning unit for scanning one or more labels, such as bar codes or QR codes, from the object and/or fastening element, in particular for determining and setting the predetermined torque value and/or tolerance range. The scanning unit may be common to both, the unit for determining object data and the unit for determining a type and/or material of the fastening element.

According to another development, the object may be a vehicle or a wheel of a vehicle and the object data may include at least one of vehicle identification data, wheel data, such as rim of wheel data, and a predefined torque value, or the object may be an assembly part, such as a glass element or building panel, and the object data may include a minimum torque value as the predetermined torque value.

In a further development, the electric hand tool may comprise a memory unit for storing measurement data, such as the above mentioned data or values.

According to another development, the transmitted data may further include data obtained or determined by one or more of the units (i) to (v). The data, such as the above mentioned data or values, may thus be transmitted to the external memory (documentation device) for further processing. The data may be transmitted wirelessly (using e.g., Bluetooth, Wifi, mobile network) or via a wired connection.

The invention further provides a certification system that comprises an electric hand tool according to this development, and a documentation device comprising a receiver for receiving the measurement data and a memory for storing the measurement data.

In a development of the certification system, the documentation device is configured to generate a digital or printed certificate including one or more of the measurement data, in particular for proving compliance of the measurement data with respective safety standards.

The invention further provides a certification method comprising the following steps: driving a shaft of an electric hand tool and, via the shaft, a socket connected to the electric hand tool, and driving a fastening element received in the socket; measuring a torque applied to the shaft via the driving unit by a torque sensor; limiting the measured torque to a predetermined value and/or adjusting the measured torque to the predetermined value within a tolerance range; transmitting data including a final toque value applied to the fastening element from the electric hand tool to a documentation device; and generating, by the documentation device, a digital or printed certificate including the final torque value.

Therefore, the invention provides a traceable logging of a torque value and issuance of a corresponding certificate.

In a development of the certification method, the following further steps are carried out: determining data regarding at least one of a geo-position of the electric hand tool, a current time and/or a duration of torque application, a number of rotations or a rotation angle of the shaft, object data for an object to which a fastening element, such as a bolt or nut, is fastened by the electric hand tool, a type and/or material of the fastening element; transmitting the determined data to the documentation device; and generating the digital or printed certificate including the transmitted data.

Further features and exemplary embodiments as well as advantages of the present invention will be explained in greater detail hereinafter by means of the drawings in the following. It is clear that the embodiments do not exhaust the field of the present invention. It is further clear that some or all of the features described in the following can also be combined with one another in a different way.

DETAILED DESCRIPTION

Figure 1:
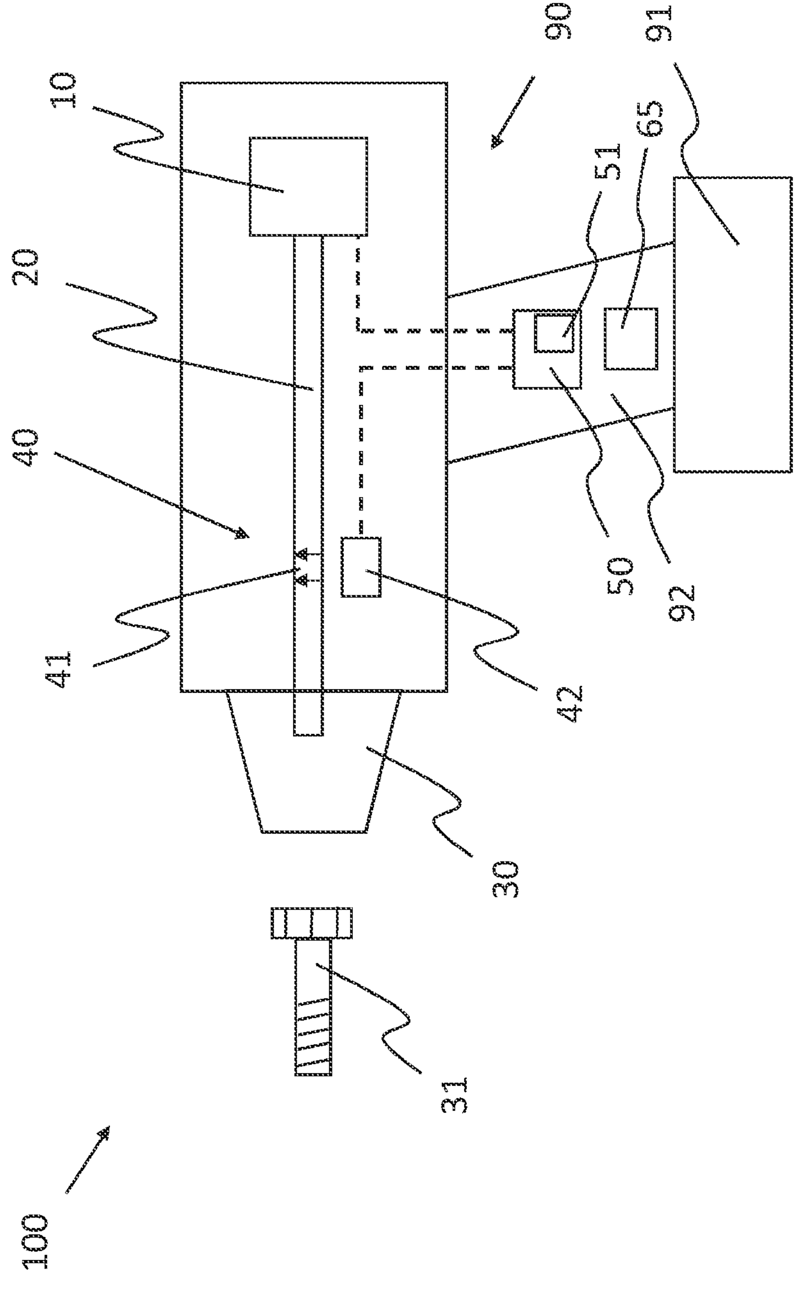
FIG. 1 shows a first embodiment of the electric hand tool according to the invention.

FIG. 1 shows a first embodiment of the electric hand tool 100 according to the invention.

The electric hand tool 100 comprises a driving unit (electric motor) 10 for driving the shaft 20 of the electric hand tool 100 and the driving unit 10 is configured to drive, via the shaft 20, the socket 30 that is connectable to the electric hand tool 100. The electric hand tool 100 further has a torque sensor 40 for measuring a torque applied to the shaft 20 via the driving unit 10; and a control unit 50 for controlling the driving unit 10 to limit the measured torque to a predetermined value and/or to adjust the measured torque to the predetermined value within a tolerance range; and a transmitter 65 for transmitting data from the electric hand tool to an external memory, the data comprising a final torque value. The electric hand tool 100 may be an impact wrench or a screw driver. The control unit 50 determines the final measured torque value applied to the shaft 20 and controls the transmitter 65 to transmit the final applied torque value to the external memory.

In this embodiment, the electric hand tool 100 has a rechargeable battery unit 91 attached to a housing 90 to supply the driving unit 10 with electrical energy. In this example, the battery unit 91 is attached to a hand grip 92 of the housing 90.

The socket 30 may receive a fastening element 31 such as a nut, bolt or screw that can be driven and fixed to an object. The control unit 50 receives a measurement signal from the magnetostrictive torque sensor 40 and controls the driving unit 10 to adjust the applied torque value by increasing the torque until it is within a predefined tolerance range around the predetermined value that is used for a current fastening process. The predetermined value and/or the tolerance range is stored in a memory 51 of the electric hand tool 100.

In this embodiment, the torque sensor 40 may be a magnetostrictive torque sensor and comprises a magnetized portion 41 of the shaft 20 and a magnetic field sensor 42 for detecting a magnetic field change external to the shaft 20. However, the torque sensor 40 may alternatively include a strain gage.

The driven shaft is 20 magnetized and the magnetic field sensor 42 is provided near the magnetized portion 41 to determine the magnetic field changes when a torque is applied, which torque results in a torsion of the shaft 20 and thereby generating the magnetic field change at the location of the magnetic field sensor due to the inverse magnetostrictive effect. The magnetization of the shaft 20 may be provided during manufacturing of the electric hand tool 100, and a calibration of the magnetic field sensor signal in relation to the applied torque may be stored in a memory of the sensor.

Torque sensors based on the principle of the inverse magnetostrictive effect are described for example in EP 3 050 790 B1. A magnetized shaft (as a primary sensor part) generates a magnetic field outside the shaft as a function of an applied torque, which can be detected contactless by a magnetic field sensor (as a secondary sensor part). The magnetic field change is usually directly proportional to the applied torque. A corresponding one-time calibration is be performed during the manufacturing phase of the torque sensor to relate the magnetic field change to the applied torque.

Other torque sensors on the basis of the inverse magnetostrictive effect are described in the European patent application No. 21 183 622.6. These torque sensors comprise a disc which comprises a magnetostrictive, premagnetized or magnetizable material; and a magnetic field sensor arrangement; wherein a torque acting about an axis of rotation of the disc can be applied to the disc and the magnetostrictive material is designed to generate a magnetic field outside the disc which can be varied as a function of the acting torque; wherein the magnetic field sensor arrangement is designed to output a signal on the basis of the magnetic field generated by the magnetostrictive material; and wherein the torque sensor is configured to determine a value of the acting torque on the basis of the output signal. A disk acting as a force-transmitting element is used to measure the applied torque by premagnetizing at least a part of the disk. In particular, the disk may have spokes connecting the inner portion and the outer portion of the disk, and one or more spokes may be magnetized. In this way, the disk, rather than a shaft on which the disk may be placed, is used as the primary sensor.

Figure 2:
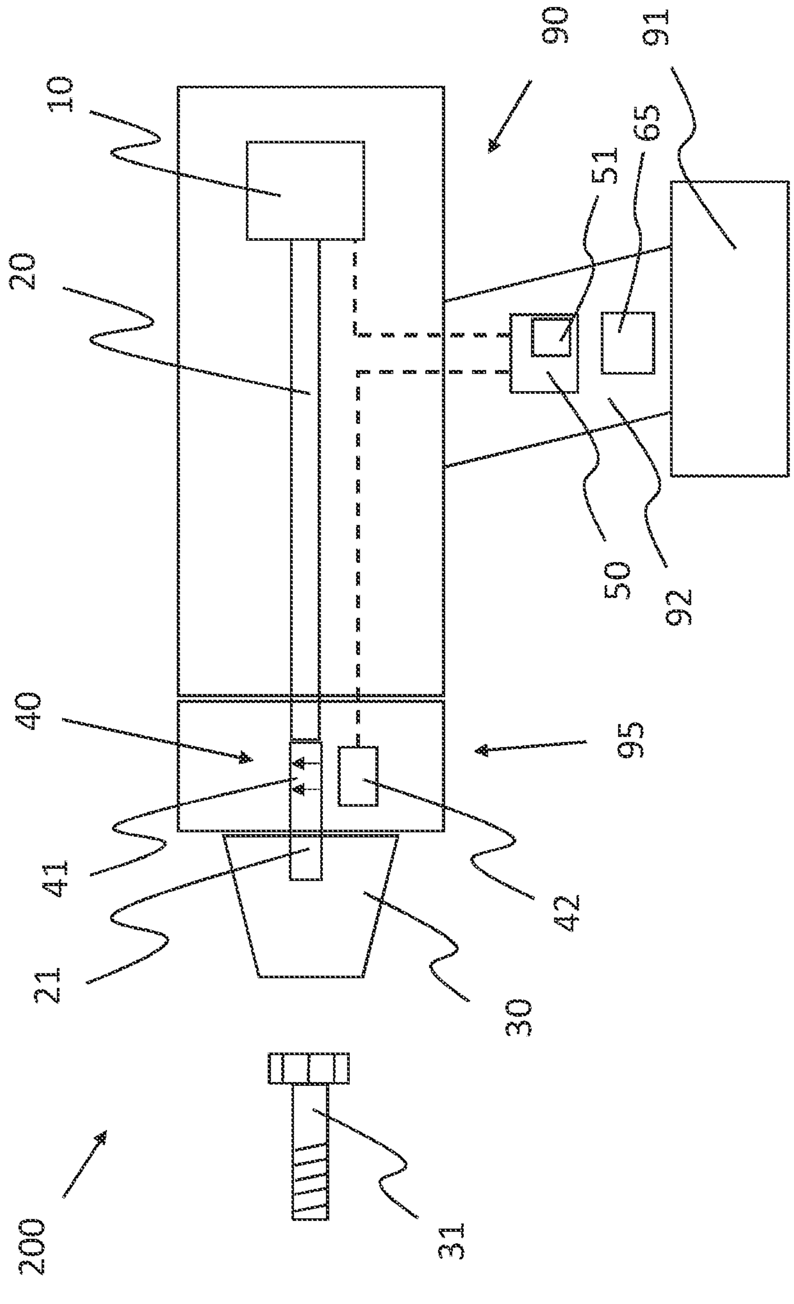
FIG. 2 shows a second embodiment of the electric hand tool according to the invention.

FIG. 2 shows a second embodiment of the electric hand tool 200 according to the invention.

The electric hand tool 200 according to the second embodiment is similar to the electric hand tool 100 of the first embodiment according to FIG. 1, with the exception that an add-on module 95 is provided that is separable from the housing 90 of the electric hand tool 200 and the add-on module 95 comprises an extension portion 21 of the shaft 20, and wherein the magnetostrictive torque sensor 40 is provided in the add-on module. The extension portion 21 of the shaft 20 and the shaft 20 engage each other when a connection of the add-on module 95 to the housing 90 is established.

The add-on module 95 is a separate part that can be used only when a torque measurement is required and/or when a certification of the applied torque is required. The add-on module 95 can be connected to the shaft 20 on one side of the module 95 and to the socket 30 on the opposite side of the module 95. The driven shaft 20 in turn drives the extension portion 21 of the shaft 20 of the module 95.

Figure 3:
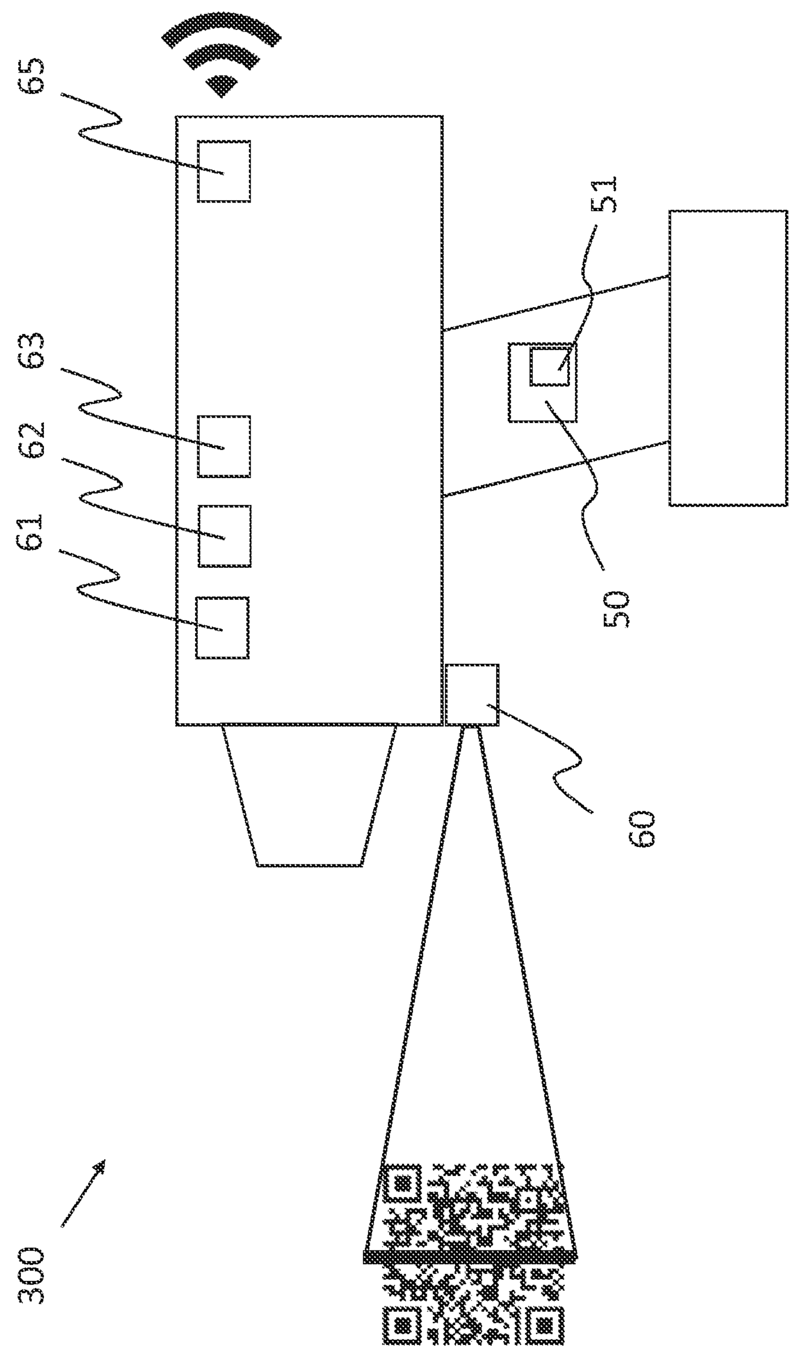
FIG. 3 shows further details of the electric hand tool according to the invention, applicable to the first and second embodiments.

FIG. 3 shows further details of an electric hand tool 300 according to the invention.

The electric hand tool 300 comprises one or more of the following elements that are connected to the control unit 50:

- a scanning unit 60 for scanning one or more labels, such as bar codes or QR codes, from an object, in particular for determining and setting the predetermined torque value and/or tolerance range of the torque value, and/or for determining object data for an object to which a fastening element, such as a bolt or nut, is fastened by the electric hand tool, and/or for determining a type and/or material of the fastening element, and/or at least one of vehicle identification data, wheel data, such as rim of wheel data
- a unit 61 for determining the geo-position, such as GPS-module
- a clock 62 for determining a current time and/or a duration of torque application
- a unit 63 for determining a number of rotations or a rotation angle of the shaft 20, in particular after a minimum torque value has been reached, this unit may for example include a magnetic pole ring attached to the shaft and co-rotating with the shaft, while a magnetic field sensor counts magnetic pulses from the pole ring
- a transmitter 65 for transmitting measurement data and/or determined data from the electric hand tool to an external memory, the transmitter may transfer data wirelessly, for example via Bluetooth, WiFi, or a mobile/cellular network, alternatively, a wired connection may be established Respective measurement data can be stored in the memory 51 connected to the control unit.

One or more of these elements may be provided in the electric hand tools 100, 200 according to the first and second embodiments described above and shown in FIGS. 1 and 2, respectively. Specific details shown in FIGS. 1 and 2 have been omitted in FIG. 3 for illustration purposes only.

The transmitter 65 is required in combination with the certification system and method according to the invention. This will be described in the following embodiment.

Figure 4:
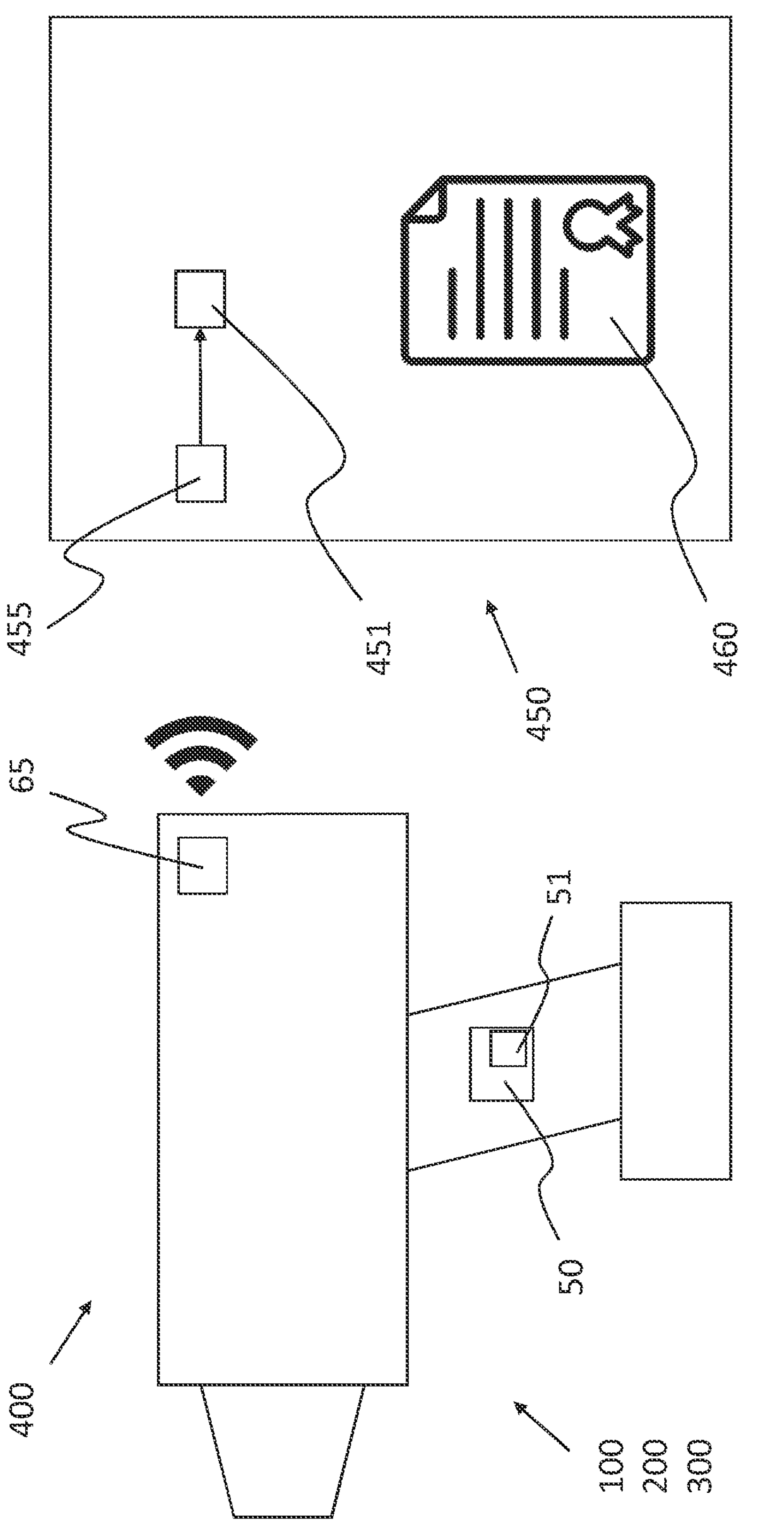
FIG. 4 shows an embodiment of the certification system according to the invention.

FIG. 4 shows an embodiment of the certification system 400 according to the invention.

In this embodiment, the certification system 400 comprises an electric hand tool 100, 200, 300 according to one of the above described embodiments and shown in FIGS. 1, 2, and 3, and a documentation device 450 comprising a receiver 455 for receiving the measurement data and/or determined data and a memory 451 for storing the measurement data and/or determined data.

The documentation device 450 is configured to generate a digital or printed certificate 460 including one or more of the measurement data and/or determined data, in particular for proving compliance of the measurement data with respective safety standards.

In the following some of the important elements included in embodiments of the present invention are summarized.

The invention provides an electric hand tool. The electric hand tool, such as an impact wrench or screwdriver has a (automated) target setting (e.g. manually or via bar code/QR code scanner or RF code) and torque detection. On the one hand, the critical tightening parameters such as torque, number of revolutions, rotational speed, driving duration (sec) can be recorded and controlled and, on the other hand, the contact pressure, time, GPS position as well as the tools used (drill hole diameter, insert bits, or screw nut) and the screws used in each case can be recorded and documented. This is to ensure traceability of the work performed.

The data recorded in this way is either initially stored temporarily in the tool and read out at a later time, or alternatively uploaded in real time via a wireless connection (Bluetooth, Wifi, mobile network) to a central unit or cloud and read out and evaluated using special software.

With the help of the data obtained and processed in this way, the traceability of the work performed can be ensured and a corresponding certificate of conformity on the proper execution of the work can be issued. This traceability can be used either on construction sites and craft workshops, but also in the proper assembly/bolting of wheel rims in car workshops.

Specifically, an impact wrench for automotive workshops with intelligent adjustment of the prescribed torque (based on input of vehicle type and rim type) is provided. The integrated torque sensor regulates the required torque of the impact wrench according to the individual, maximum value. A wireless connection to a central evaluation system (certification device) records and stores the applied torque data for each individual mounted wheel. Specifically, a rim code may be recorded and stored for each wheel, so as to identify the individual wheels as front-left, front-right, rear-left, and rear-right. Further, even the individual screw holes may be identified and the corresponding torque values be documented and certified.

The customer benefits refer to safety, specifically due to an exact setting of the individually specified torque, which depends on the vehicle type and the respective rim type.

In addition, the torque detection is contactless by means of magnetostriction, premagnetization of the “shaft”. The sensor can be integrated in the tool or be provided as a separate plug-on module (accessory). Further advantages are the creation of a traceable documentation/certificate by recording all critical screw parameters, as well as other parameters, such as one or more of GPS position, time and work duration. In addition, there is the possibility to store the material data/vehicle data/rim data.

The embodiments are only exemplary and the full scope of the present invention is defined by the claims.

What is claimed is:

1. An electric hand tool, comprising:

a driving unit that drives a shaft of the electric hand tool and configured to drive, via the shaft, a socket of the electric hand tool or a socket connectable to the electric hand tool;

a torque sensor that measures a torque applied to the shaft via the driving unit;

a control unit that controls the driving unit to one or both of limit the measured torque to a predetermined value and adjust the measured torque to the predetermined value within a tolerance range;

a transmitter that transmits data from the electric hand tool to an external memory, the data comprising a final measured torque value; and at least one of:

a clock unit for determining a duration of torque application; and a unit for determining a number of rotations after a minimum torque value has been reached.

2. The electric hand tool according to claim 1, wherein the torque sensor comprises a magnetostrictive torque sensor or a strain gage.

3. The electric hand tool according to claim 2, wherein the magnetostrictive torque sensor comprises a magnetized portion of the shaft and a magnetic field sensor for detecting a magnetic field change external to the shaft.

4. The electric hand tool according to claim 2, wherein the magnetostrictive torque sensor comprises a magnetized portion of a disk and a magnetic field sensor for detecting a magnetic field change external to the disk.

5. The electric hand tool according to claim 1, further comprising an add-on module separable from a housing and comprising an extension portion of the shaft, wherein the torque sensor is provided in the add-on module.

6. The electric hand tool according to claim 1, further comprising at least one of:

the clock unit for determining a current time of the torque application;

a unit for determining a rotation angle of the shaft, after a minimum torque value has been reached;

a unit for determining object data for an object to which a fastening element is fastened by the electric hand tool; and a unit for determining one or both of a type and a material of the fastening element.

7. The electric hand tool according to claim 6, wherein one or both of the unit for determining the object data and the unit for determining one or both of the type and the material of the fastening element comprises a scanning unit for scanning one or more labels from the object for determining and setting one or both of the predetermined torque value and a tolerance range of the torque value.

8. The electric hand tool according to claim 6, wherein the object is a vehicle or a wheel of a vehicle and the object data include at least one of vehicle identification data, wheel data, and a predefined torque value; or wherein the object is an assembly part and the object data include a minimum torque value as the predetermined torque value.

9. The electric hand tool according to claim 6, wherein the transmitted data further include data obtained or determined by one or more of the units.

10. The electric hand tool according to claim 1, further comprising a memory that stores measurement data.

11. A certification system, comprising:

the electric hand tool according to claim 1; and a documentation device comprising a receiver for receiving and a memory for storing measurement data and determined data.

12. The certification system according to claim 11, wherein the documentation device is configured to generate a digital or printed certificate including one or more of the measurement data and the determined data for proving compliance of the measurement data with respective safety standards.

13. A certification method, comprising:

driving a shaft of an electric hand tool and, via the shaft, a socket connected to the electric hand tool, and driving a fastening element received in the socket;

measuring a torque applied to the shaft via a driving unit by a torque sensor;

limiting the measured torque to a predetermined value and/or adjusting the measured torque to the predetermined value within a tolerance range;

transmitting data including a final measured torque value applied to the fastening element from the electric hand tool to a documentation device;

generating, by the documentation device, a digital or printed certificate including the final measured torque value; and determining data including at least one of:

determining a duration of torque application; and determining a number of rotations after a minimum torque value has been reached.

14. The certification method according to claim 13, further comprising:

transmitting the determined data to the documentation device; and generating the digital or printed certificate including the transmitted data.

15. The certification method according to claim 14, wherein the determined data further includes at least one of:

a current time of the torque application;
a rotation angle of the shaft;
object data for an object to which a fastening element is fastened by the electric hand tool; and
one or both of a type and a material of the fastening element.

* * * * *